US012811456B2

(12) United States Patent
Wagner

(10) Patent No.: US 12,811,456 B2
(45) Date of Patent: Nov. 24, 2026

(54) ELECTRICAL MULTI-PHASE MACHINE WITH COOLING IN STATOR GROOVES

(71) Applicant: Liebherr-Electronics and Drives GmbH, Lindau (DE)

(72) Inventor: Tobias Wagner, Grafenau (DE)

(73) Assignee: Liebherr-Electronics and Drives GmbH, Lindau (DE)

( * ) Notice: Subject to any disclaimer, the term of this patent is extended or adjusted under 35 U.S.C. 154(b) by 191 days.

(21) Appl. No.: 18/730,687

(22) PCT Filed: Jan. 16, 2023

(86) PCT No.: PCT/EP2023/050813

§ 371 (c)(1),
(2) Date: Jul. 19, 2024

(87) PCT Pub. No.: WO2023/139012

PCT Pub. Date: Jul. 27, 2023

(65) Prior Publication Data

US 2025/0167613 A1 May 22, 2025

(30) Foreign Application Priority Data

Jan. 21, 2022 (DE) ......................... 102022101432.0
Mar. 24, 2022 (DE) ......................... 102022106995.8

(51) Int. Cl.
*H02K 3/24* (2006.01)
*H02K 1/16* (2006.01)
(Continued)

(52) U.S. Cl.
CPC ................. *H02K 3/24* (2013.01); *H02K 1/16* (2013.01); *H02K 3/28* (2013.01); *H02K 3/345* (2013.01);
(Continued)

(58) Field of Classification Search
CPC ................................ H02K 3/24; H02K 16/04
See application file for complete search history.

(56) References Cited

U.S. PATENT DOCUMENTS 5,917,295 A 6/1999 Mongeau
6,288,460 B1 9/2001 Fakult et al.
(Continued)

FOREIGN PATENT DOCUMENTS

DE 19838378 A1 3/2000
DE 102011012453 A1 8/2012
(Continued)

OTHER PUBLICATIONS

International Search Report from Application No. PCT/EP2023/050813 dated Apr. 21, 2023.
(Continued)

*Primary Examiner* — Tulsidas C Patel
*Assistant Examiner* — Robert E Mates
(74) *Attorney, Agent, or Firm* — Troutman Pepper Locke LLP; Ryan A. Schneider; Nicholas H. Doss

(57) ABSTRACT

An electrical multi-phase machine including a stator assembly having a stator-side winding, and rotor which is rotatably mounted relative to same and which forms an external rotor surrounding the stator assembly on the outer circumferential side, wherein a fluid-cooling device is provided for the stator-side winding, wherein the winding coils thereof are accommodated in stator grooves, each formed as a coolant channel, and wherein a coolant flowing through the stator grooves washes around the winding wire in the stator grooves.

42 Claims, 3 Drawing Sheets

(51) Int. Cl.

| | |
|---|---|
| ***H02K 3/28*** | (2006.01) |
| ***H02K 3/34*** | (2006.01) |
| ***H02K 7/08*** | (2006.01) |
| ***H02K 11/33*** | (2016.01) |
| ***H02K 16/04*** | (2006.01) |

(52) U.S. Cl.
CPC ............. *H02K 7/083* (2013.01); *H02K 11/33* (2016.01); *H02K 16/04* (2013.01)

(56) References Cited

U.S. PATENT DOCUMENTS

| | | | | |
|---|---|---|---|---|
| 6,570,361 | B1 | 5/2003 | Edelson | |
| 2006/0137899 | A1* | 6/2006 | Schafer | H02K 3/34 174/128.1 |
| 2010/0148622 | A1* | 6/2010 | Dooley | H02K 21/22 310/201 |
| 2010/0270094 | A1 | 10/2010 | Nakayama et al. | |
| 2021/0036568 | A1 | 2/2021 | Schulz | |
| 2021/0088117 | A1* | 3/2021 | Lazarewicz | H02K 7/025 |

FOREIGN PATENT DOCUMENTS

| | | | |
|---|---|---|---|
| DE | 102018102750 | A1 | 8/2019 |
| WO | 2020191167 | A1 | 9/2020 |
| WO | 2021029309 | A1 | 2/2021 |

OTHER PUBLICATIONS

Written Opinion from Application No. PCT/EP2023/050813.
Search Report from German Application No. 1020221069958.

* cited by examiner

ELECTRICAL MULTI-PHASE MACHINE WITH COOLING IN STATOR GROOVES

CROSS-REFERENCE TO RELATED APPLICATIONS

This application is a National Stage of International Application No. PCT/EP2023/050813 filed 16 Jan. 2023, which claims benefit under 35 USC § 365 of DE Application Nos. 10 2022 101 432.0 filed 21 Jan. 2022 and 10 2022 106 995.8 filed 24 Mar. 2022, each of which is incorporated herein by reference in its entirety as if set forth herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

SEQUENCE LISTING

Not Applicable STATEMENT REGARDING PRIOR DISCLOSURES BY THE INVENTOR OR A JOINT INVENTOR Not Applicable

BACKGROUND OF THE DISCLOSURE

1. Field of the Invention

The present invention relates to an electrical multi-phase machine comprising a stator assembly and a rotor which is rotatably mounted relative to same and which forms an external rotor surrounding the stator assembly on the outside.

2. Description of Related Art

Large construction machines such as excavators, tracked vehicles or cranes, as well as material handling machines such as forklifts, dump trucks, and generally lifting gear for heavy loads or agricultural machinery and attachments often rely on hydraulic concepts for their drive technology, as high power densities are required to provide corresponding performance with a reasonable size, which is known to be well fulfilled by hydrostats. In this respect, the pumps of the hydraulic drives are regularly driven by internal combustion engines, for example in the form of large diesel units.

However, in order to be able to work at least locally emission-free, for such large energy-intensive machines more recently there have also been used electric drive concepts, wherein due to the desired high power densities, what is regularly used are electrical multi-phase machines. For example, these can be permanently magnet excited synchronous machines, which are considered to be the most power dense type of electrical machine. In this respect, the achievable power density depends largely on the current density, which in turn requires sufficient cooling to allow higher current densities.

In this respect, the electric machines must not only realize high power densities, but also provide high drive torques in order to replace hydraulic drive concepts. External rotor machines are particularly suitable for high torques, as they can regularly provide a higher torque than internal rotor machines with the same external dimensions. However, the external rotor poses special challenges in terms of construction size. It is particularly the slim, elongated designs that can hardly be realized. External rotors are usually designed as disk rotors with short bar lengths and short diameters in order to be able to control the lower tilting moments with a one-sided, adjusted bearing. However, such disk rotors with short bar lengths and large diameters are difficult to house in construction machinery, conveyor vehicles or lifting gear, as the installation space is limited.

In order to achieve high current densities and thus high power densities, the winding coils can be wound concentratedly, but this tends to lead to a relatively large ripple in the torque output. Simultaneously, there is a high temperature load on the winding, as the usual cooling at the winding heads protruding over the stator laminations is no longer available or no longer functions to a sufficient extent with concentrated windings.

Proceeding therefrom, it is the underlying object of the present invention to create an improved electrical multi-phase machine which avoids the disadvantages of the prior art and further develops the latter in an advantageous manner. In particular, the aim is to achieve a compact construction size that allows high current densities and can provide high torques and high power densities without overheating due to the high current densities. In this respect, the torque output should preferably not exhibit excessive ripple and a high level of availability and low probability of failure of the multiphase machine should also be achieved.

BRIEF SUMMARY OF THE INVENTION

According to the invention, the object is solved by an electrical multi-phase machine comprising a stator assembly including stators, a stator-side winding and a common rotor that is rotatably mounted relative to the stator assembly and which forms an external rotor surrounding the stator assembly on an outer circumferential side, wherein a fluid-cooling device is provided for the stator-side winding, wherein winding coils of the stator-side winding are accommodated in stator grooves, each formed as a coolant channel, and wherein a cooling liquid flowing through the stator grooves washes around a winding wire in the stator grooves.

Preferred embodiments of the invention are the subject-matter of the dependent claims.

It is therefore proposed to cool the stator winding with liquid and, in this respect, to wash around the winding wire directly with the cooling liquid in order to achieve direct heat transfer and thus efficiently cool the hotspots of the machine in a targeted manner. According to the invention, a fluid-cooling device is provided for the stator-side winding, wherein the winding comprises winding coils which are accommodated in stator grooves, each of which is configured to be a coolant channel, and a cooling fluid/coolant flowing through the stator grooves washes around the winding wire in the stator grooves.

Advantageously, in further development of the invention, the winding coils are not to be encapsulated and cooling gaps which can be flushed through by cooling liquid are provided between adjacent portions of the winding wire of a coil. This allows the cooling liquid to wash around the winding wire directly from several sides and penetrate between neighboring winding wire portions.

Advantageously, the winding wire of the winding coils can have a trapezoidal cross-section rather than a round or rectangular one. This makes it easy to form gaps between adjacent wire portions when winding around the coil. In a similar manner, this can also be achieved by a triangular wire cross-section or generally a cross-section that tapers from one side to the opposite side.

In this respect, the winding wire is advantageously wound in such a way that the wider back of the cross-section is adjacent to the stator lamination or stator lamination teeth and/or the narrower cross-section side protrudes towards the center of the stator gap. This widens the gap between two adjacent wire portions towards the center of the stator groove, which makes it easier for the cooling liquid to penetrate.

Advantageously, the winding coils can be wound in a single layer. This enables the winding wire to be essentially completely washed around.

In a further development of the invention, it may be provided that the winding wire of the winding coils is coated in an electrically insulating manner, for example with a coating of a high-temperature resistant thermoplastic, in particular with a PEEK coating.

Alternatively or independently of this, it may be provided that the stator grooves of the at least one stator are flow-connected on one axial end face of the stator to an annular space provided on the end face of the stator for supplying the cooling liquid and/or are flow-connected on an opposite end face of the stator to a collection outlet provided therein.

Further, it may be provided that the cooling liquid is first guided in axially opposite directions from the cold side of the cooling circuit through the stator grooves for the winding coils in parallel from one end face to the opposite end face of the stator, and then the cooling liquid heated by the winding coils is guided in axially opposite direction through the stator carrier back towards the upstream side.

Furthermore, it is proposed that the stator grooves are connected in parallel to an inlet manifold for the supply of cooling liquid and that the cooling liquid can flow through them in parallel.

In a further development of the invention, it is proposed to subdivide the stator assembly into a plurality of stators and to provide a common rotor therefor, which can be supported by the subdivision of the stators between the stators. This makes it possible to achieve a better-balanced bearing that is less sensitive to tilting loads and allows for much longer rotor designs when compared to a single-sided, adjusted bearing.

In particular, the stator assembly comprises two stators which are surrounded on the outer circumferential side by the common rotor, wherein the rotor is supported between the two stators on an inwardly disposed motor shaft or motor axis surrounded by the stators. Due to the central support of the rotor, much greater rotor lengths can be controlled in terms of bearing forces than is the case with disc rotors with one-sided, angled bearings, so that overall much slimmer, elongated designs can be realized, wherein high torques can nevertheless be achieved simultaneously. The proposed arrangement thus combines the ease of installation and form of an internal rotor with the higher torque density of an external rotor.

According to a further aspect, such several stators combined under a jointly external rotor can be cooled by a liquid cooling system which supplies the two stators equally with fresh and/or cold cooling liquid not yet heated by the respective other stator, wherein the two stators can be cooled in particular in parallel in order to improve the cooling effect.

In this respect, the two stators can be arranged in parallel in a coolant circuit so that both stators can be supplied equally with coolant that is still cool and one stator does not receive the coolant that has already been heated by the other stator, as is the case with serial coolant arrangements or also with a single, continuous and long stator.

As an alternative to a parallel connection of the two stators in a jointly cooling circuit, two separate cooling circuits can also be provided for the two stators in order to be able to apply cool coolant to both stators equally.

In a further development of the invention, the two stators are configured to be at least essentially the same length and arranged symmetrically to the common rotor, wherein the rotor extending over both stators can be supported centrally and thus balanced. The rotor can protrude to the same extent on both sides of the bearing point or be configured to be symmetrical with respect to the central bearing point. Irrespective of this, the two stators can form a symmetrical arrangement with respect to the central support point of the rotor.

By dividing the stators symmetrically, the active bar length per stator can be halved in comparison to a single stator, which also improves the overall cooling of the stator assembly.

Due to the shorter bar length of the stators as a result of the division of the stator assembly into at least two stators, a significantly improved cooling effect can be achieved through the parallel coolant supply, which in turn enables higher current densities in order to achieve high power densities.

Advantageously, the stator-side winding can also be configured to be multiphase, and a star point can be dispensed with. In particular, the stator-side winding comprises at least four or at least five or at least six phases or more and is configured without a star in this respect. Such a multi-phase winding without a star point can significantly reduce the torque ripple, in particular by more than 50%, also when the winding coils are wound concentratedly. Machines with concentratedly wound windings in particular tend to have a relatively high ripple in the torque curve. However, the proposed high number of phases increases the frequency of the torque ripple while simultaneously reducing its amplitude.

Preferably, the number of phases is odd in order to obtain a maximum winding factor, wherein preferably five phases or seven phases or new phases or more can be provided.

In this respect, the number of poles can be greater or less than the number of phases.

Irrespective thereof, operation can be optimized through intelligent, individual energizing of the individual phases depending on the load range and position of the rotor. For example, the average copper temperature or wire temperature can be reduced for certain load ranges by adjusting the current supply. Since no zero-sum current condition applies to multi-phase windings without a star point, i.e., the sum of the phase currents does not necessarily have to be zero, different or arbitrary current forms can be realized.

In the event of a fault, such as a short circuit between two phases or a line break, this allows machine operation to continue, at least to a limited extent. This can significantly reduce the probability of failure and increase availability.

In particular, the stator-side winding can be designed to be nine-phase without a star point. A winding with nine phases is a good compromise between low ripple in torque behavior and still moderate installation effort with a compact design. In principle, there can be considered more than nine winding phases, for example eleven phases or thirteen phases or also fifteen phases. However, a winding with nine phases achieves a sufficient reduction in torque ripple and can also be mounted with reasonable effort when the winding is concentratedly wound.

The winding is advantageously configured to be concentrated. In this respect, a concentrated winding means that each tooth of the stator lamination of the stator is washed around by the winding wire and the winding wire of a coil is not simultaneously wound around several teeth. Such concentrated winding has a high degree of automation and allows short winding heads. As a result, the losses in a coil can be reduced due to the reduced copper consumption and a higher power density can be achieved due to the smaller installation space requirement. In combination with a multi-phase winding design, the otherwise usual disadvantage of concentrated windings, namely the ripple in the torque output, can be compensated for.

In this respect, the winding phases of the stator-side winding are advantageously connected to a control circuit that can energize the individual phases individually and variably. In particular, the control circuit may comprise an inverter with full bridges, preferably in the form of H-bridges, for energizing the individual phases.

Advantageously, the control circuit can be configured to energize the individual phases individually with an individual time offset so that, for example, if one phase fails in the event of a fault, the timing of the energizing of the remaining phases can be adjusted in order to achieve smooth, harmonious operation. Alternatively or in addition to variable control of the start of the pulses in the case of pulsed energizing, the length and/or height of the current pulses can also be varied in order to achieve operational optimization, for example to reduce the average wire temperature for certain load ranges by adjusting the energizing.

In a further development of the invention, the multi-phase machine can be a permanent magnet excited machine, for example in the form of a permanent magnet excited synchronous machine. In this respect, the stators in particular can be provided with a multi-phase winding, while the rotor is provided with permanent magnets.

In this respect, at least two permanent magnets or two fields of permanent magnets can be provided on the rotor, which are arranged on both sides of the central support of the rotor, in particular on both sides of a central bearing flange of the rotor, with which the rotor is supported between the stators on the inwardly disposed motor shaft or motor axis.

The support or bearing of the rotor can be configured in different ways, for example comprising two angular contact bearings, for example in the form of tapered roller bearings. In a further development of the invention, however, the rotor can also be supported by a simple fixed and floating bearing at two points, wherein the floating bearing can essentially only accommodate radial forces and the fixed bearing can accommodate radial and axial forces.

Depending on the connection of the rotor to the output shaft—or in case of a generator to the input shaft—the bearing can be configured to different specifications. For example, the rotor can be connected to the inwardly disposed motor shaft in a rotationally fixed manner via the central support, preferably axially fixed and tilt-resistant, for example via a profiled shaft connection or axially clamped on a spline.

Regardless of the specific drive connection of the rotor, the inwardly disposed motor shaft or motor axis can be mounted at opposite end portions or opposite housing portions, for example by means of the aforementioned fixed and floating bearing. For example, the bearing of the motor shaft or motor axis can be provided in the region of the opposite axial end faces of the stator assembly. This makes it possible to achieve stable support thanks to the correspondingly large bearing spacing.

In order to achieve a high power density with a compact, slim design, the rotor can have an axial length that is greater than the outer diameter of the rotor. For example, the axial length of the rotor can be in the region of 125% to 500% or 125% to 200% of the rotor diameter.

The two stators together can have an axial length that is in the range of the axial length of the rotor, but in comparison can be a little smaller or a little larger. For example, the sum of the two stators, each measured as their bar length, can be 75% to 100% of the total axial length of the rotor. In particular, the total bar length of the two stators can correspond approximately to the sum of the axial lengths of the two fields of permanent magnets attached to the rotor.

Advantageously, the proposed structure of the multi-phase machine can be used to create a machine series in which the machines or machine models can basically have the same structure, but the number of phases can vary depending on the construction size.

In this respect, the combination of phases and number of poles can also be adapted and varied depending on the application. In this way there is achieved a modular system.

These and other objects, features and advantages of the present invention will become more apparent upon reading the following specification in conjunction with the accompanying drawing figures.

BRIEF DESCRIPTION OF THE DRAWINGS

The accompanying Figures, which are incorporated in and constitute a part of this specification, illustrate several aspects described below.

DETAIL DESCRIPTION OF THE INVENTION

Figure 1:
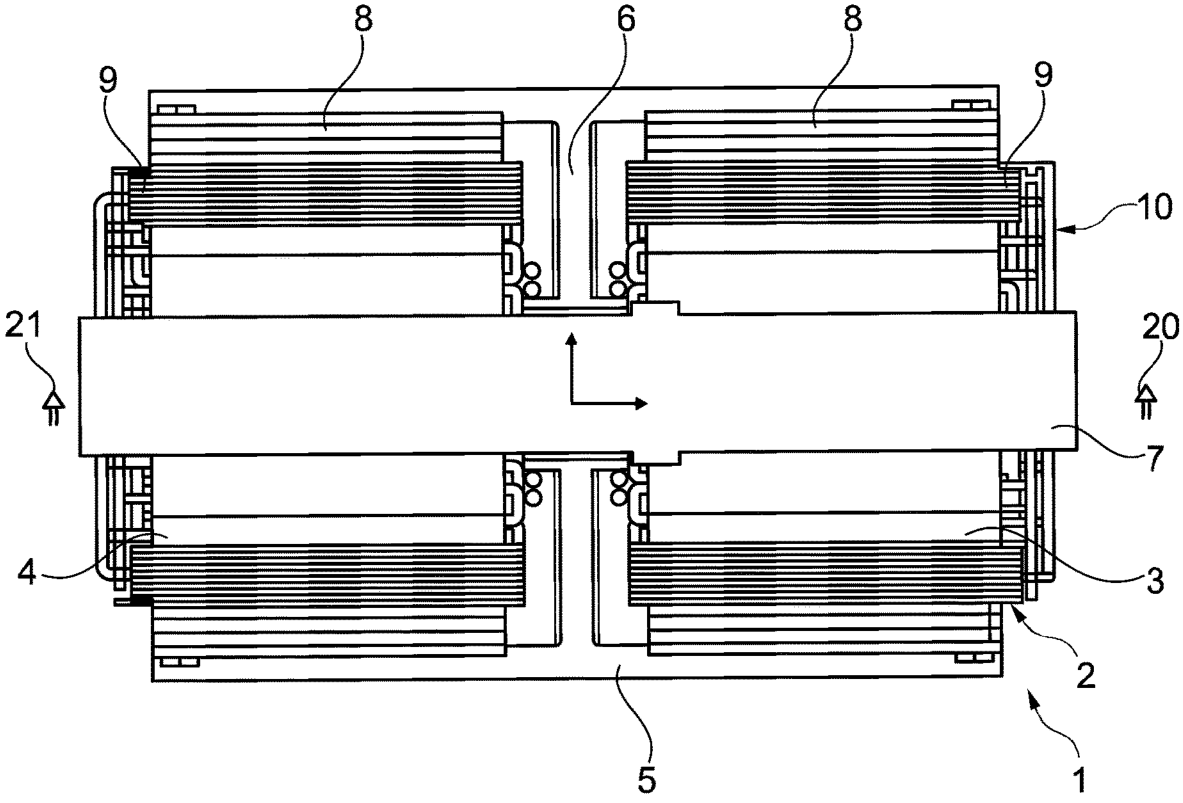
FIG. 1 a longitudinal section through an electric multi-phase external rotor machine with two symmetrically arranged stators without a star point under a common rotor and a directly cooled winding on the stators according to an advantageous embodiment of the invention.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

As shown in the figures, the electrical multi-phase machine 1, which functions as a drive motor but can also operate as a generator, comprises a stator assembly 2 and a rotor 5 which is rotatably mounted relative to same and which forms an external rotor surrounding the stator assembly 2 on the outer circumferential side.

Such an external rotor machine can be designed for high torques and have a high power density in order to drive large construction machines, conveyor vehicles or machines or lifting gear such as cranes or agricultural vehicles as well as attachments. In this respect, the external rotor machine can serve as a travel drive or drive a main function unit of the respective machine, for example the hoisting gear of a crane. For example, the multi-phase machine can be designed for continuous outputs of several hundred kW, for example 200-500 kW, in order to replace hydrostats or hydrostatic drive arrangements.

As shown in the figures, the electrical multi-phase machine 1, which functions as a drive motor but can also operate as a generator, comprises a stator assembly 2 and a rotor 5 which is rotatably mounted relative to same and which forms an external rotor surrounding the stator assembly 2 on the outer circumferential side.

Such an external rotor machine can be designed for high torques and have a high power density in order to drive large construction machines, conveyor vehicles and machines or lifting gear such as cranes. In this respect, the external rotor machine can serve as a travel drive or drive a main function unit of the respective machine, for example the hoisting gear of a crane. For example, the multi-phase machine can be designed for continuous outputs of several hundred kW, for example 200-500 kW, in order to replace hydrostats or hydrostatic drive arrangements.

As shown in FIG. 1, the stator assembly 2 can be divided into two stators 3, 4, which can be arranged coaxially to each other and spaced apart from each other.

In this respect, the two stators 3, 4 are surrounded on the outer circumferential side by a common rotor 5, which interacts with both stators.

Advantageously, the rotor 5 can be equipped with one or more permanent magnets 8, while the stator assembly 2 can be provided with a winding 9, as will be more specifically explained.

By dividing the stator assembly 2 into two spaced apart stators 3, 4, the common rotor 5 can be supported in a central portion between the two stators 3, 4. In particular, the rotor 5 can comprise a support 6 exactly in the center, which can extend between the two stators 3, 4 to an inwardly disposed motor shaft 7 or motor axis, wherein the support 6 can comprise, for example, a radially extending or annular support web, which can extend from the inner circumferential wall of the tubular rotor body inwardly projecting between the stators 3, 4.

The support 6 can be fastened to the motor shaft 7 or motor axis in a non-tiltable and/or axially fixed and/or rotationally fixed manner. If the drive movement of the rotor 5 is derived via the motor shaft 7—or, when used as a generator, is introduced into the rotor 5 via the shaft 7—the rotor 5 can be anchored to the shaft 7 in a rotationally fixed manner and preferably also non-tiltable and axially fixed manner via the support 6, for example by form-fitting using suitable connecting means such as a splined shaft profile. Alternatively or additionally, the rotor support 6 can also be pressed onto the shaft 7.

The shaft can be supported at opposite end portions and/or at opposite end portions of the housing, for example adjacent to the end faces of the stator assembly 2, by a bearing arrangement with two bearing points 20, 21, wherein, for example, a simple fixed and floating bearing arrangement can be provided here, which can comprise a radial bearing on the one hand and a combined axial/radial bearing, for example in the form of suitable rolling bearings.

In this respect, the shaft 7 extends inside the stator assembly 2 coaxially thereto.

As FIG. 1 shows, each stator 3, 4 can be provided with a multi-phase winding 9.

The rotor 5 can be equipped with two fields of permanent magnets 8, each of which runs directly on the outer circumferential side over one of the windings 9 of the stator assembly 2, wherein the permanent magnets 8 can be completely covered on the inner circumferential side by one of the windings 9, cf., FIG. 1.

The permanent magnets 8 can each have an axial length that can essentially correspond to the axial bar length of the associated stator 3, 4.

In particular, the rotor 5 including the permanent magnets 8 can be configured to be symmetrical with respect to the central support 6. The arrangement of the stators 3, 4 can also be symmetrical with respect to the central support 6.

As shown in FIG. 1, the multi-phase machine 1 can have a slim, elongated design due to the central support 6 of the rotor 5. The rotor 5 can have an axial length that is greater than the diameter of the rotor 5, for example in the region of 150%-200% of the rotor diameter.

The rotor length, i.e., the extension of the rotor 5 in the direction of the motor shaft 7, can at least approximately correspond to the sum of the two axial lengths of the stators 3, 4.

Advantageously, a liquid cooling system 10 is provided for the stator assembly 2 to cool the multi-phase machine 1, wherein the two stators 3, 4 can advantageously be arranged in parallel in one cooling circuit or cooled by two separate cooling circuits, so that cool coolant can flow through each stator 3, 4 equally and one of the stators does not receive the coolant already heated by the other stator. Cooling the stators 3, 4 in parallel in this way can significantly improve the cooling effect, which allows a significantly higher current density. In this way there can be achieved a high power density.

Figure 2:
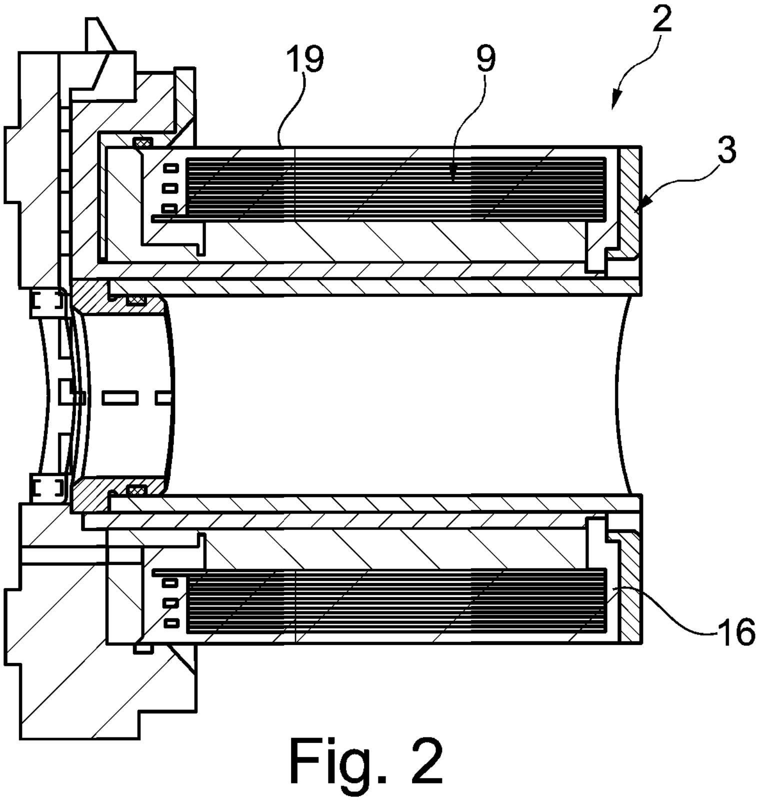
FIG. 2 is a sectional longitudinal section through one of the stators of the multi-phase machine from FIG. 1, showing the coolant flow through the stator.
Figure 3:
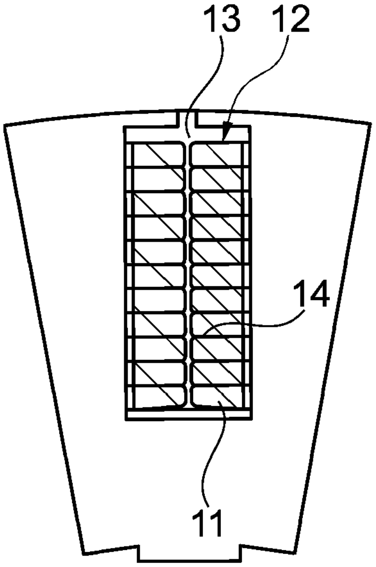
FIG. 3 is a cross-sectional view of a winding groove and the winding of trapezoidal winding wire accommodated therein to improve coolant circulation.

As shown in FIG. 2, the liquid cooling apparatus 10 can be configured to wash around the winding wire 11 of the winding coils 12 of the multi-phase winding 9 directly with the cooling liquid. In other words, the coolant is not guided through the winding 9 by cooling tubes or cooling tube coils, but washes around the winding wires 11 directly.

For this purpose, the winding coils 12 can be accommodated in stator grooves 13, each of which is configured to be a coolant channel and forms part of the cooling circuit, so that the coolant in the stator grooves can wash around the winding wire 11 directly. In this respect, the walls of the stator grooves form a cooling channel wall so that the winding wires, so to speak, float in the cooling liquid.

In order to increase the heat transfer surface of the winding wire 11 to the coolant, the winding coils can advantageously not be encapsulated and comprise cooling gaps 14 or free spaces or intermediate spaces between the winding wires 11, which can be flushed through by the cooling liquid in order to wash around the winding wire 11 with cooling liquid on several sides, preferably from all sides.

In order to specifically increase the cooling effect, the winding coils 12 can advantageously be concentratedly wound in a single layer. Thanks to the single layer winding, the coolant being washed around reliably reaches all winding wires, which considerably improves the cooling effect and prevents the formation of hotspots in the winding. Thanks to the concentrated winding, a high power density and an overall compact design can nevertheless be achieved. In this respect, concentrated winding means that each tooth of the stator laminations is wrapped in winding wire 11.

Advantageously, the winding wire can have a trapezoidal cross-section, so that sufficiently large cooling gaps 14 are formed between the winding turns or between adjacent winding wire portions when the stator lamination teeth are wrapped and the coolant can penetrate into the winding layer or wash around the winding wire on several sides.

The winding wire 12 can advantageously be coated with elastic insulation, for example with a high-temperature-resistant thermoplastic coating. In an advantageous further development of the invention, the winding wire 11 of the winding 9 may comprise a PEEK, i.e., polyetheretherketone coating.

In order to cool the multi-layer winding 9 of the stator groove 3, 4 evenly, the cooling liquid can flow through the several winding phases or the stator grooves 13 in parallel. The stator grooves can be connected in parallel to each other in a cooling circuit and the coolant can flow through them in parallel.

In order to cool the stator grooves 13 evenly, an inlet manifold can be provided upstream of an end face of the stator winding 9, for example in an intermediate plate between the motor and the inverter, which distributes the coolant coming from the cold side of the cooling system to the various stator grooves 13. The inlet manifold can, for example, comprise an annular space at the end face of the winding 9, to which the stator grooves 13 are connected with their end faces in a communicating manner.

On the outlet side, the stator grooves 13 can be connected to a collection outlet 16 of the liquid cooling apparatus 10, wherein the collection outlet 16 can comprise, for example, an annular space at the end face of the respective stator 3, 4, with which the stator grooves 13 are in flow connection, so that cooling liquid flowing out of the stator grooves 13 is collected in the collection outlet 16.

As shown in FIG. 2, the cooling liquid can be guided through the stator carrier 3, 4 in counterflow or axially in opposite directions. The cold coolant coming from the cold side can flow in parallel through the stator grooves 13 in a first axial direction, for example as shown in FIG. 2, from left to right through the stator 3, 4, while the collected, heated coolant can be guided in the opposite axial direction, for example as shown in FIG. 2, from right to left through drainage channels 17 back to the end face of the stator groove where the cold coolant was also supplied.

In order to seal the stator 3, 4 through which cooling liquid flows in a fluid-tight manner in respect to the rotor 5, the stator 3, 4 can be surrounded by a sealing sleeve or a sealing tube 19, which seals or encapsulates the stator, in particular its winding grooves 13. Such a sleeve-shaped sealing tube 19 can in particular extend around the stator 3, 4 and between the stator 3, 4 and the rotor 5, for example sitting on the outer circumferential side of the stator 3, 4.

As a sealing tube there can be used, for example, a carbon fiber tube or a similar plastic tube, such as a GRP tube or a thermoplastic tube made of sufficiently temperature-resistant thermoplastic. Alternatively or additionally, a sleeve made of stainless steel or another non-magnetic material or material mixtures can also be used as a sealing tube.

Figure 4:
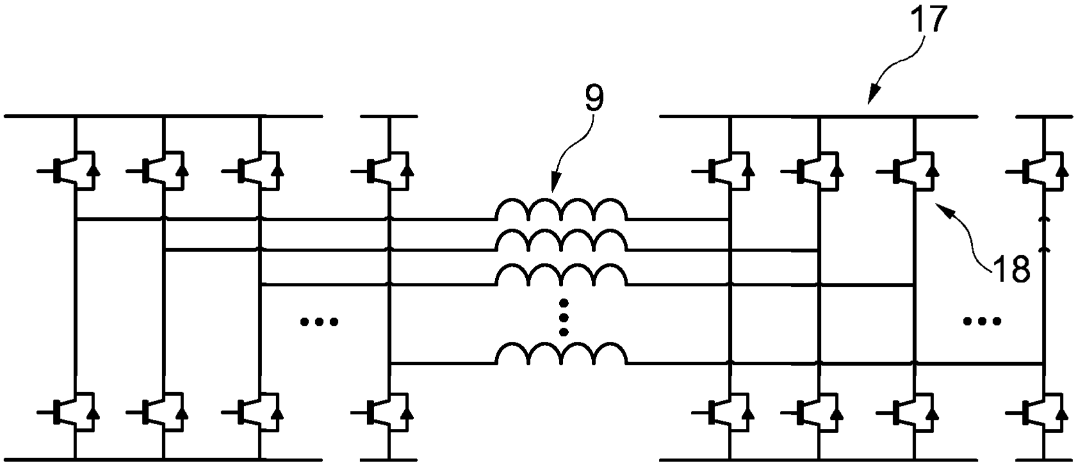
FIG. 4 is an equivalent circuit diagram of a multi-phase winding without a star and the connected inverter with full bridges according to an advantageous embodiment of the invention.

As shown in FIG. 4, the stator winding 9 can be configured without a star and comprise more than three or more than six or, for example, nine phases. For example, a nine-phase winding of concentratedly wound coils 12 without a star point enables individual control of the individual phases, which can be cleverly used to improve machine operation. Since no zero-sum current condition applies to multi-phase windings without a star point, i.e., the sum of the phase currents does not necessarily have to be zero, different or arbitrary current forms can be realized. In the event of a fault, such as a short circuit between two phases or a line break, this allows machine operation to continue, at least to a limited extent. The current supply to the remaining functional phases can be adjusted for this purpose.

Irrespective thereof, operation can be optimized through intelligent, individual energizing of the individual phases depending on the load range and position of the rotor. For example, the average copper temperature or wire temperature can be reduced for certain load ranges by adjusting the energizing.

In principle, a multi-phase winding without a star point, for example in the form of the nine-phase winding without a star point, can also significantly reduce the torque ripple, in particular by more than 50%. Machines with concentratedly wound windings in particular tend to have a relatively high ripple in the torque curve. However, the proposed high number of phases increases the frequency of the torque ripple while simultaneously reducing its amplitude. In principle, more than nine winding phases can also be considered, for example twelve phases or even fifteen phases. However, a winding with nine phases is a good compromise between low ripple in the torque behavior and still moderate assembly effort with a compact design with concentrated winding.

As shown in FIG. 4, the winding 9 without a star can advantageously be connected to an inverter 17 with full bridges, in particular in the form of H-bridges. Such an inverter with full bridges allows independent energizing of the individual phases in order to be able to adjust the energizing in the event of a fault, for example, or to control it optimally depending on the load range or position of the rotor. In particular, such an inverter with full bridges also allows the individual phases to be controlled or energized with a variable time offset.

Figure 5:
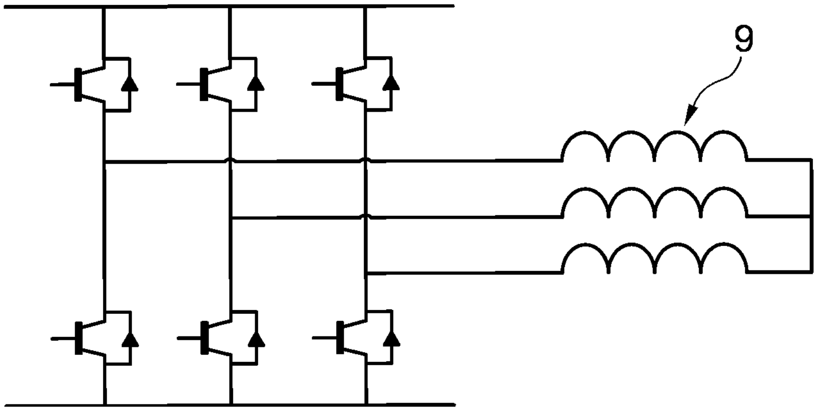
FIG. 5 is an equivalent circuit diagram of a three-phase winding which, in comparison to FIG. 4, is designed with a star point.

In comparison to the multi-phase winding without a star in FIG. 4, FIG. 5 shows a conventional three-phase winding with a star point.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

The invention claimed is:

1. An electrical multi-phase machine comprising:
- a stator assembly including:
  - at least one stator;
  - a stator carrier; and
  - a stator-side winding comprising winding coils of winding wire accommodated in stator grooves formed as coolant channels;
- a common rotor that:
  - is rotatably mounted relative to the stator assembly; and
  - forms an external rotor surrounding the stator assembly on an outer circumferential side; and
- a fluid-cooling device provided for the stator-side winding; and configured to guide a flow of a cooling liquid in a first axial direction from a cold side of a cooling circuit in parallel through the stator grooves from one axial end face to an opposite axial end face of the at least one stator and then, in a second axially opposite direction from the first axial direction, the cooling liquid heated by the winding coils is guided through the stator carrier back towards an upstream side.

2. The electrical multi-phase machine according to claim 1, wherein the winding coils are configured not to be encapsulated; and
- wherein cooling gaps are provided between adjacent portions of the winding wire of a winding coil, the cooling gaps configured to be flushed through by the cooling liquid.

3. The electrical multi-phase machine according to claim 1, wherein the winding wire has a cross-sectional shape that results in the formation of gaps between adjacent winding wire portions when winding around the winding coil.

4. The electrical multi-phase machine according to claim 3, wherein the gaps between adjacent winding wire portions project towards a center of a stator gap.

5. The electrical multi-phase machine according to claim 1, wherein the winding coils are wound in a single layer.

6. The electrical multi-phase machine according to claim 1, wherein the winding wire is coated in an electrically insulating manner.

7. The electrical multi-phase machine according to claim 1, wherein the winding wire is coated in a high-temperature resistant thermoplastic.

8. The electrical multi-phase machine according to claim 1, wherein the stator grooves are connected in parallel to one another to an inlet manifold for supplying the cooling liquid and can be flowed through in parallel by the cooling liquid.

9. The electrical multi-phase machine according to claim 1, wherein the stator grooves of at least one stator are flow-connected at one of the axial end faces to an annular space for supplying the cooling liquid and/or are flow-connected at the other of the axial end faces to a collection outlet provided therein.

10. The electrical multi-phase machine according to claim 1, wherein;
- the stator assembly has two stators that are surrounded on the outside by the common rotor; and
- the two stators are arranged in parallel in the cooling circuit or are connected, one each, to two separate cooling circuits, so that each stator can be flowed through by equally fresh and/or cold cooling liquid.

11. The electrical multi-phase machine according to claim 10, wherein the common rotor is supported between the two stators by means of a central support on an inwardly disposed motor shaft or machine axis surrounded by the stators.

12. The electrical multi-phase machine according to claim 11, wherein:
- the two stators are configured to be of substantially equal length and symmetrical with respect to the common rotor and the central support; and
- the common rotor is supported centrally by the central support and is configured symmetrically with respect to the central support.

13. The electrical multi-phase machine according to claim 1, wherein the common rotor is configured to be an external rotor and is supported by a fixed and floating bearing at two bearing points spaced apart from one another.

14. The electrical multi-phase machine according to claim 11, wherein the common rotor is fastened in a non-tiltable and rotationally fixed manner to the inwardly disposed motor shaft or machine axis, which in turn, is rotatably mounted at opposite end portions or end faces of the stator assembly and/or opposite housing sides of the stator assembly.

15. The electrical multi-phase machine according to claim 1, wherein the common rotor is configured to be an external rotor having an axial length which is greater than a diameter of the external rotor.

16. The electrical multi-phase machine according to claim 1, wherein the stator-side winding comprises between five and nine phases and is configured without a star point.

17. The electrical multi-phase machine according to claim 1, wherein the winding coils are concentratedly wound.

18. The electrical multi-phase machine according to claim 1, wherein winding phases of the stator-side winding are connected to a control circuit for phase-individual, variable energizing of the individual winding phases.

19. The electrical multi-phase machine according to claim 18, wherein the control circuit comprises an inverter with full bridges in the form of H-bridges, for energizing the individual winding phases with variable time offset.

20. The electrical multi-phase machine according to claim 1, wherein:

the stator assembly has two stators that are surrounded on the outside by the common rotor; and a polyphase winding is provided on each of the two stators and permanent magnets are provided on the common rotor.

21. A machine or lifting gear comprising the electrical multi-phase machine of claim 1.

22. The machine or lifting gear according to claim 21, wherein the electrical multi-phase machine forms a drive motor of a travel drive or a main function unit.

23. An electrical multi-phase machine comprising:

a stator assembly including:

two stators arranged in parallel in a cooling circuit or connected, one each, to two separate cooling circuits, so that each stator can be flowed through by equally fresh and/or cold cooling liquid;

a stator-side winding comprising winding coils of winding wire accommodated in stator grooves formed as coolant channels;

a common rotor that:

is supported between the two stators by means of a central support on an inwardly disposed motor shaft or machine axis surrounded by the stators, the motor shaft rotatably mounted by at least two rolling bearings that together form a fixed and floating bearing; and surrounds, on the outside, the two stators; and a fluid-cooling device to provide the cooling liquid.

24. The electrical multi-phase machine according to claim 23, wherein:

the winding coils are configured not to be encapsulated; and cooling gaps are provided between adjacent portions of the winding wire of a winding coil, the cooling gaps configured to be flushed through by the cooling liquid.

25. The electrical multi-phase machine according to claim 23, wherein the winding wire has a cross-sectional shape that results in the formation of gaps between adjacent winding wire portions when winding around the winding coil.

26. The electrical multi-phase machine according to claim 25, wherein the gaps between adjacent winding wire portions project towards a center of a stator gap.

27. The electrical multi-phase machine according to claim 23, wherein the winding coils are wound in a single layer.

28. The electrical multi-phase machine according to claim 23, wherein the winding wire is coated in an electrically insulating manner.

29. The electrical multi-phase machine according to claim 23, wherein the winding wire is coated in a high-temperature resistant thermoplastic.

30. The electrical multi-phase machine according to claim 23, wherein the stator grooves are connected in parallel to one another to an inlet manifold for supplying the cooling liquid and can be flowed through in parallel by the cooling liquid.

31. The electrical multi-phase machine according to claim 23, wherein the stator grooves of at least one stator are flow-connected at one axial end face of the stator to an annular space for supplying the cooling liquid and/or are flow-connected at an opposite end face of the stator to a collection outlet provided therein.

32. The electrical multi-phase machine according to claim 23, wherein the cooling liquid is first guided in axially opposite directions from a cold side of the cooling circuit in parallel through the stator grooves for the winding coils from one end face to the opposite end face of a stator of the two stators, and then the cooling liquid heated by the winding coils is guided in axially opposite directions through a stator carrier back of the stator assembly towards an upstream side.

33. The electrical multi-phase machine according to claim 23, wherein the common rotor is configured to be an external rotor and supported by the fixed and floating bearing at two bearing points spaced apart from one another.

34. The electrical multi-phase machine according to claim 33, wherein the common rotor is fastened in a non-tiltable and rotationally fixed manner to the inwardly disposed motor shaft or the machine axis, which in turn is rotatably mounted at opposite end portions or end faces of the stator assembly and/or opposite housing sides of the stator assembly.

35. The electrical multi-phase machine according to claim 23, wherein the common rotor is configured to be an external rotor having an axial length that is greater than a diameter of the external rotor.

36. The electrical multi-phase machine according to claim 23, wherein the stator-side winding comprises between five and nine phases and is configured without a star point.

37. The electrical multi-phase machine according to claim 23, wherein the winding coils are concentratedly wound.

38. The electrical multi-phase machine according to claim 23, wherein individual winding phases of the stator-side winding are connected to a control circuit for phase-individual, variable energizing of the individual winding phases.

39. The electrical multi-phase machine according to claim 38, wherein the control circuit comprises an inverter with full bridges in the form of H-bridges, for energizing the individual winding phases with variable time offset.

40. The electrical multi-phase machine according to claim 23, wherein a polyphase winding is provided on each of the two stators and permanent magnets are provided on the common rotor.

41. A machine or lifting gear comprising the electrical multi-phase machine of claim 23.

42. The machine or lifting gear according to claim 41, wherein the electrical multi-phase machine forms a drive motor of a travel drive or a main function unit.

* * * * *